United States Patent
Kim

(10) Patent No.: US 9,525,380 B2
(45) Date of Patent: Dec. 20, 2016

(54) SOLAR CELL MODULE AND PHOTOVOLTAIC POWER GENERATION SYSTEM INCLUDING THE SAME

(71) Applicant: LG ELECTRONICS INC., Seoul (KR)

(72) Inventor: Jeongshik Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/206,757

(22) Filed: Mar. 12, 2014

(65) Prior Publication Data
US 2014/0261639 A1  Sep. 18, 2014

(30) Foreign Application Priority Data
Mar. 13, 2013  (KR) .................. 10-2013-0026862

(51) Int. Cl.
| | |
|---|---|
| H02S 30/00 | (2014.01) |
| F24J 2/52 | (2006.01) |
| H02S 30/10 | (2014.01) |
| H01L 31/042 | (2014.01) |
| F16B 23/00 | (2006.01) |
| F24J 2/46 | (2006.01) |
| F16B 37/06 | (2006.01) |
| F16B 39/12 | (2006.01) |

(52) U.S. Cl.
CPC .............. *H02S 30/00* (2013.01); *F24J 2/5205* (2013.01); *F24J 2/5211* (2013.01); *F24J 2/5254* (2013.01); *H02S 30/10* (2014.12); *F16B 23/00* (2013.01); *F16B 37/065* (2013.01); *F16B 39/122* (2013.01); *F24J 2002/4669* (2013.01); *Y02E 10/47* (2013.01)

(58) Field of Classification Search
CPC ..................................................... F16B 37/065
USPC .. 52/173.3; 136/251, 244; 257/433; 126/623
See application file for complete search history.

(56) References Cited

U.S. PATENT DOCUMENTS

| | | | | |
|---|---|---|---|---|
| 1,249,948 A | * | 12/1917 | Gruber ................. | B23K 1/0012 220/288 |
| 1,872,385 A | * | 8/1932 | Andren ................. | B21D 39/03 192/36 |
| 1,872,616 A | * | 8/1932 | Andren ................. | B21D 39/03 192/36 |
| 1,873,869 A | * | 8/1932 | Carr ...................... | F16B 37/065 29/526.2 |
| 1,883,906 A | * | 10/1932 | Hasselquist ............ | B21K 25/00 29/512 |
| 1,954,761 A | * | 4/1934 | Wiggin ................ | A43C 15/165 36/59 R |
| 4,878,795 A | * | 11/1989 | Woodrow ................. | F16B 5/01 411/183 |
| 5,578,142 A | * | 11/1996 | Hattori et al. ................ | 136/251 |
| 6,161,998 A | * | 12/2000 | Brown ................ | F16B 19/1072 411/113 |
| 6,172,295 B1 | * | 1/2001 | Hattori .................. | H01L 31/048 136/244 |
| 6,465,724 B1 | * | 10/2002 | Garvison et al. ............. | 136/244 |

(Continued)

*Primary Examiner* — Rodney Mintz
(74) *Attorney, Agent, or Firm* — Birch, Stewart, Kolasch & Birch, LLP

(57) ABSTRACT

Disclosed is a solar cell module including a solar cell panel, a frame located at a peripheral portion of the solar cell panel, the frame having a fixing hole, and a first fastening member inserted into the fixing hole, the first fastening member being provided at a side surface thereof with an engagement member configured to be engaged with a fastening tool.

18 Claims, 12 Drawing Sheets

(56) References Cited

U.S. PATENT DOCUMENTS

| | | | |
|---|---|---|---|
| 6,670,541 B2* | 12/2003 | Nagao et al. | 136/251 |
| 6,959,517 B2* | 11/2005 | Poddany et al. | 52/173.3 |
| 7,260,918 B2* | 8/2007 | Liebendorfer | 52/173.3 |
| 8,181,402 B2* | 5/2012 | Tsuzuki et al. | 52/173.3 |
| 8,221,040 B2* | 7/2012 | Babej | F16B 37/065 411/183 |
| 8,266,846 B2* | 9/2012 | Schoell | 52/173.3 |
| 8,272,189 B2* | 9/2012 | Chan et al. | 52/792.11 |
| 8,505,224 B2* | 8/2013 | Huang | 40/790 |
| 8,505,864 B1* | 8/2013 | Taylor et al. | 248/237 |
| 8,640,402 B1* | 2/2014 | Bilge | 52/173.3 |
| 8,701,361 B2* | 4/2014 | Ferrara | 52/173.3 |
| 8,752,338 B2* | 6/2014 | Schaefer et al. | 52/60 |
| 8,813,441 B2* | 8/2014 | Rizzo | 52/173.3 |
| 8,935,893 B2* | 1/2015 | Liu | F24J 2/5258 126/623 |
| 9,331,223 B2* | 5/2016 | Kim | H02S 20/00 52/173.3 |
| 2003/0035700 A1* | 2/2003 | Chiang | F16B 37/065 411/303 |
| 2005/0000562 A1* | 1/2005 | Kataoka et al. | 136/251 |
| 2005/0115176 A1* | 6/2005 | Russell | 52/220.1 |
| 2007/0199561 A1* | 8/2007 | Soucy | 126/623 |
| 2008/0193254 A1* | 8/2008 | Selle | F16B 37/062 411/188 |
| 2009/0232616 A1* | 9/2009 | Sekreta et al. | 411/107 |
| 2010/0083954 A1* | 4/2010 | Bartelt-Muszynski | 126/704 |
| 2010/0154784 A1* | 6/2010 | King et al. | 126/623 |
| 2011/0047903 A1* | 3/2011 | Kobayashi | F24J 2/5211 52/173.3 |
| 2011/0138585 A1* | 6/2011 | Kmita et al. | 24/522 |
| 2011/0154750 A1* | 6/2011 | Welter et al. | 52/173.3 |
| 2011/0214365 A1* | 9/2011 | Aftanas | 52/173.3 |
| 2011/0239546 A1* | 10/2011 | Tsuzuki et al. | 52/11 |
| 2011/0239554 A1* | 10/2011 | Tsuzuki et al. | 52/173.3 |
| 2011/0299957 A1* | 12/2011 | Young | 411/401 |
| 2012/0102853 A1* | 5/2012 | Rizzo | 52/173.3 |
| 2012/0255598 A1* | 10/2012 | West | 136/251 |
| 2013/0055662 A1* | 3/2013 | Gilles-Gagnon et al. | 52/173.3 |
| 2013/0087138 A1* | 4/2013 | Ubach Cartategui et al. | 126/696 |
| 2013/0284238 A1* | 10/2013 | Park | H01L 31/0424 136/251 |
| 2014/0137927 A1* | 5/2014 | Kim | H01L 31/042 136/251 |

* cited by examiner

SOLAR CELL MODULE AND PHOTOVOLTAIC POWER GENERATION SYSTEM INCLUDING THE SAME

CROSS-REFERENCE TO RELATED APPLICATION

This application claims the priority benefit of Korean Patent Application No. 10-2013-0026862, filed on Mar. 13, 2013 in the Korean Intellectual Property Office, the disclosure of which is incorporated herein by reference.

BACKGROUND OF THE INVENTION

1. Field of the Invention

The embodiments of the invention relate to a solar cell module and a photovoltaic power generation system including the same, and more particularly to a solar cell module having an improved coupling structure and a photovoltaic power generation system including the same.

2. Description of the Related Art

Recently, due to depletion of existing energy resources, such as oil and coal, interest in alternative sources of energy to replace the existing energy resources is increasing. Most of all, solar cells are popular next generation cells to convert sunlight into electrical energy.

A photovoltaic power generation system is constructed by fixing a solar cell module, including a plurality of solar cells, to a support structure. In a related art, a plurality of holes are drilled in both a support structure and a solar cell module, and alignment of the respective holes is implemented. In such a state, one fastening member is located at the outer side of the support structure and the other fastening member is located at the inner side of the support structure (i.e. between the solar cell module and the support structure), and thereafter the fastening members are assembled with each other to fix the solar cell module to the support structure.

In the above described process, however, due to the fact that the fastening members are individually arranged, a worker has difficulty in assembling the fastening members with each other because an assembly process must be implemented in a state in which one fastening member is located at the outer side of the support structure and the other fastening member is located at the inner side of the support structure. This increases time and costs required to couple the solar cell module to the support structure. In addition, when external shock is applied or continuous vibration is applied after coupling of the solar cell module and the support structure, the fastening members may be easily loosened. This may result in damage to the solar cell module or deterioration in power generation quantity of the solar cell module.

SUMMARY OF THE INVENTION

Therefore, the embodiments of the invention have been made in view of the above problems, and it is one object of the embodiments of the invention to provide a solar cell module, which may simplify a coupling process thereof and enhance coupling stability, thereby achieving enhanced photoelectric conversion efficiency and stability, and a photovoltaic power generation system including the same.

It is another object to provide a solar cell module, which may ensure that a coupling structure thereof is not usually loosened, but is easily loosened as needed, and a photovoltaic power generation system including the same.

In accordance with one aspect of the embodiment of the invention, the above and other objects can be accomplished by the provision of a solar cell module including a solar cell panel, a frame located at a peripheral portion of the solar cell panel, the frame having a fixing hole, and a first fastening member inserted into the fixing hole, the first fastening member being provided at a side surface thereof with an engagement member configured to be engaged with a fastening tool.

In accordance with another aspect of the embodiment of the invention, there is provided a photovoltaic power generation system including a solar cell module including a solar cell panel and a frame located at a peripheral portion of the solar cell panel, the frame having a first fixing hole, a support member configured to support the solar cell module, and a fastening member configured to fix the solar cell module and the support member to each other, wherein the fastening member includes a first fastening member inserted into the first fixing hole, the first fastening member being provided at a side surface thereof with an engagement member configured to be engaged with a fastening tool, and a second fastening member connected to the support member and fastened to the first fastening member.

BRIEF DESCRIPTION OF THE DRAWINGS

The above and other objects, features and other advantages of the embodiments of the invention will be more clearly understood from the following detailed description taken in conjunction with the accompanying drawings, in which.

DETAILED DESCRIPTION OF THE EMBODIMENTS

Figure 1:
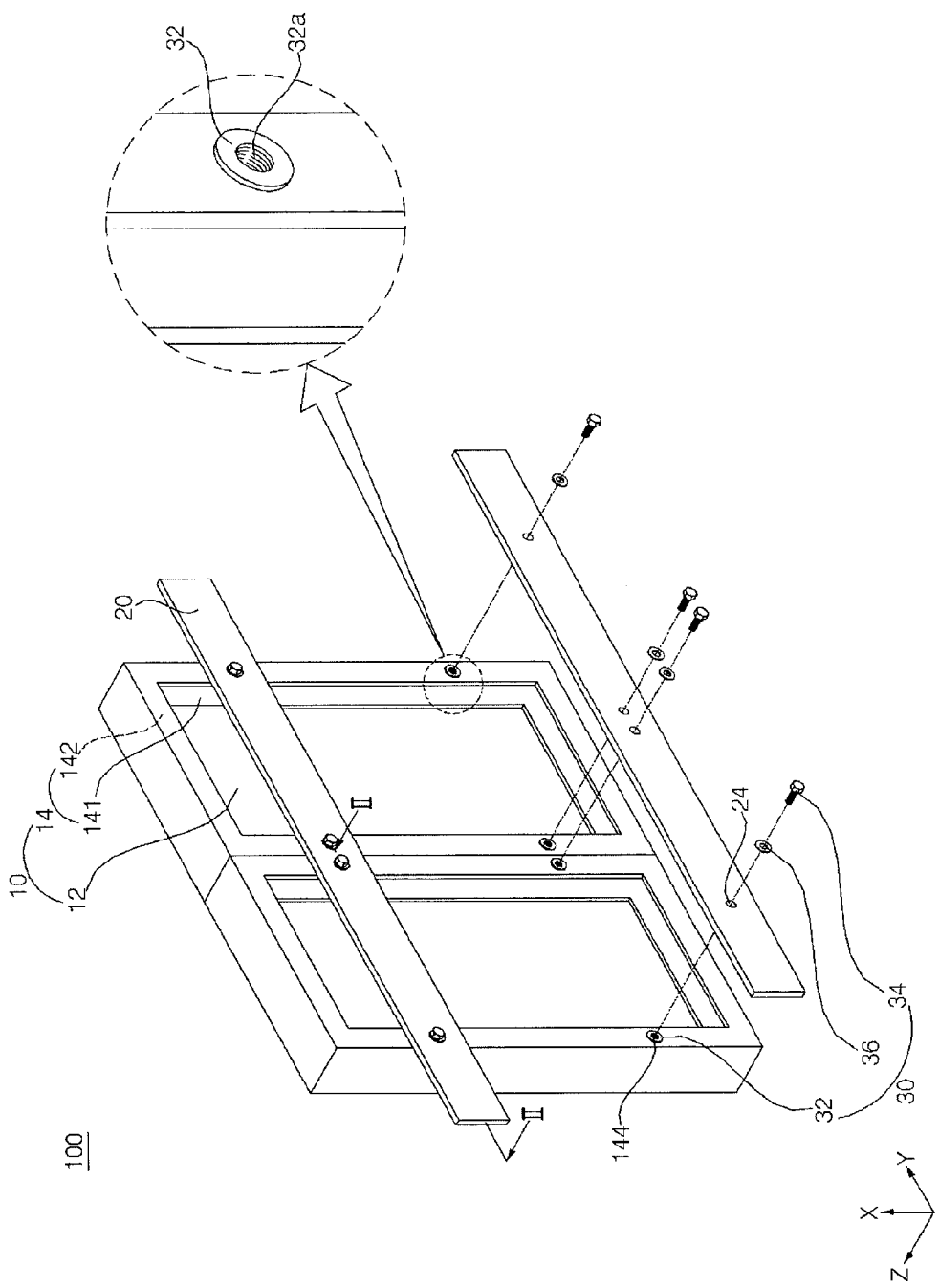
FIG. 1 is a rear exploded perspective view showing a photovoltaic power generation system in accordance with an embodiment of the invention.

Reference will now be made in detail to the embodiments of the invention, examples of which are illustrated in the accompanying drawings. However, it will be understood that the embodiments of the invention should not be limited to the embodiments and may be modified in various ways.

In the drawings, to clearly and briefly explain the embodiments of the invention, illustration of elements having no connection with the description is omitted, and the same or similar elements are designated by the same reference numerals throughout the specification. In addition, in the drawings, for more clear explanation, the dimensions of elements, such as thickness, width, and the like, are exaggerated or reduced, and thus the thickness, width, and the like of the embodiments of the invention are not limited to the illustration of the drawings.

In the entire specification, when an element is referred to as "including" another element, the element should not be understood as excluding other elements so long as there is no special conflicting description, and the element may include at least one other element. In addition, it will be understood that, when an element such as a layer, film, region or substrate is referred to as being "on" another element, it can be directly on the other element or intervening elements may also be present. On the other hand, when an element such as a layer, film, region or substrate is referred to as being "directly on" another element, this refers to there being no intervening elements therebetween.

Hereinafter, a support frame for a photovoltaic power generation system and a photovoltaic power generation system including the same in accordance with the embodiments of the invention will be described in more detail with reference to the accompanying drawings.

Figure 2:
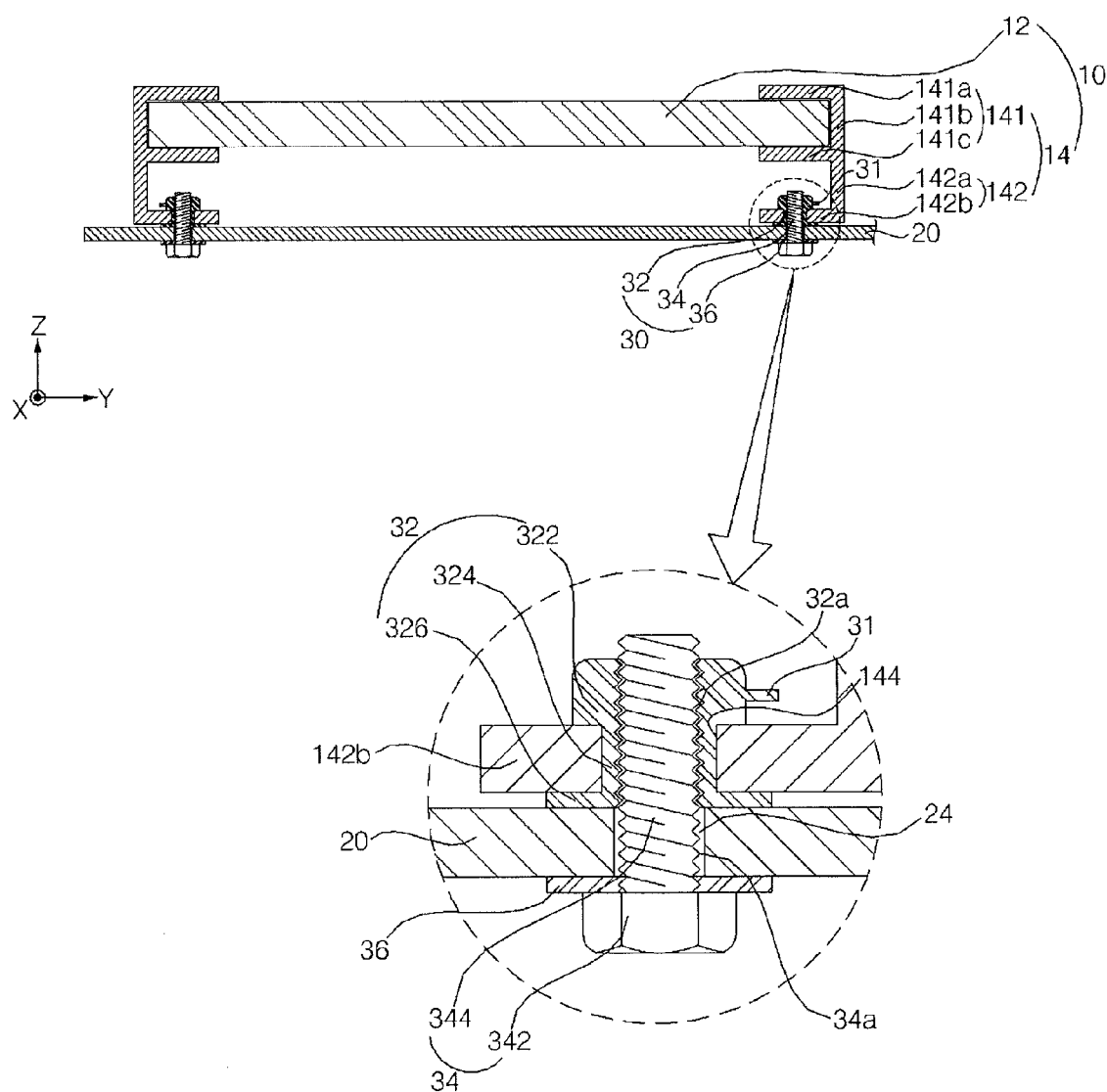
FIG. 2 is a sectional view taken along line II-II of FIG. 1.

FIG. 1 is a rear exploded perspective view showing a photovoltaic power generation system in accordance with an embodiment of the invention, and FIG. 2 is a sectional view taken along line II-II of FIG. 1.

Referring to FIGS. 1 and 2, the photovoltaic power generation system, designated by reference numeral 100, in accordance with the present embodiment includes a solar cell module 10, and a support member 20 to which the solar cell module 10 is fixed using a fastening member 30. In the present embodiment, the fastening member 30 includes a first fastening member 32 integrally coupled to the solar cell module 10, and a second fastening member 34 penetrating the solar cell module 10 and the support member 20, the second fastening member 34 being fastened to the first fastening member 32. This will be described below in more detail.

The solar cell module 10 may include a solar cell panel 12 provided with at least one solar cell. The solar cell panel 12 may include a seal to hermetically seal the at least one solar cell, and a substrate for protection of the solar cell, for example.

In one example, the solar cell may be a silicon solar cell, dye sensitized solar cell, compound semiconductor solar cell, tandem solar cell, thin film solar cell, or the like. The seal serves to intercept moisture, oxygen, and the like that may have a negative effect on the solar cell, and may be formed of various materials. In one example, the seal may be an ethylene vinyl acetate (EVA) copolymer resin film. The substrate serves to protect the solar cell from external shock. The substrate is arranged at a light receiving face of the solar cell panel 12 and may have excellent light transmittance. However, the embodiments of the invention are not limited to the above description, and various kinds and types of solar cells as well as various coupling methods thereof may be applied to the embodiments of the invention.

To stably fix the solar cell panel 12 having the above described several layers, a frame 14 may surround a peripheral portion of the solar cell panel 12. Although the frame 14 is shown in the drawing as surrounding the entire peripheral portion of the solar cell panel 12, the embodiments of the invention are not limited thereto. Thus, various modifications, such as, for example, a modification in which the frame 14 surrounds only a portion of the solar cell panel 12, are possible.

In the present embodiment, the frame 14 may include a first frame part 141 into which at least a portion of the solar cell panel 12 is inserted, and a second frame part 142 extending outward from the first frame part 141.

More specifically, the first frame part 141 may be comprised of a portion 141a located at a light receiving face of the solar cell panel 12, a portion 141b located at a side surface of the solar cell panel 12, and a portion located at a rear face of the solar cell panel 12. These portions 141a, 141b, and 141c of the first frame part 141 may be connected to one another such that the peripheral portion of the solar cell panel 12 is seated in a space defined between the portions 141a, 141b, and 141c. In one example, the first frame part 141 may have a "U"-shaped or "⊏"-shaped form. The second frame part 142 may be comprised of an orthogonal portion 142a extending rearward from the first frame part 141 so as to be orthogonal to the solar cell panel 12, and a parallel portion 142b bent from the orthogonal portion 142a to extend parallel to the rear face of the solar cell panel 12 with a constant distance therebetween. In one example, the second frame part 142 may have an "L"-shaped form. However, the shape of the frame 14 may be modified in various ways, and the embodiments of the invention are not limited thereto.

The frame 14 may be fixed to the solar cell panel 12 in various ways. In one example, a peripheral portion of the solar cell panel 12 may be formed of an elastic material (for example, an elastic tape), and the solar cell panel 12 may be inserted into the first frame part 141 using the elastic portion. However, the embodiments of the invention are not limited thereto, and various modifications, such as, for example, a modification in which a plurality of pieces constituting the frame 14 is respectively assembled to the peripheral portion of the solar cell panel 12, are possible.

The solar cell module 10 is fixed to the support member 20 using the fastening member 30. Considering an example configuration as proposed in the present embodiment, a plurality of support members 20 is arranged at a major face of each solar cell module 10 and each support member 20 takes the form of a solid bar. More specifically, as shown in FIG. 1 by example, one bar-shaped support member 20 and the other bar-shaped support member 20 are located respectively at the top and bottom of each solar cell module 10, such that the two support members 20 correspond to the major face of the solar cell module 10. However, the embodiments of the invention are not limited thereto, and the support member 20 may have a hollow rectangular bar shape, or may have an "I"-shaped or "II"-shaped cross section. Of course, it will be appreciated that the support member 20 may have various other shapes.

The fastening member 30 is located at a position where the support member 20 and the parallel portion 142b of the solar cell module 10 overlap each other, and serves to fix the solar cell module 10 to the support member 20. In the present embodiment, the fastening member 30 includes the first fastening member 32 and the second fastening member 34, which are fastened to each other. In this instance, the first fastening member 32 is coupled to the solar cell module 10, and the second fastening member 34 is fastened to the first fastening member 32 while being connected to the support member 20. In addition, to further enhance fastening strength, the fastening member 30 may further include a fastening aid 36.

More specifically, the parallel portion 142b of the second frame part 142 is provided with a first fixing hole 144 at a position overlapping with the support member 20, and the first fastening member 32 is fitted into the first fixing hole 144. As such, the first fastening member 32, which constitutes the fastening member 30 for coupling of the solar cell module 10 and the support member 20, is disposed on the parallel portion 142a of the second frame part 142 spaced apart from the solar cell panel 12. This may eliminate the likelihood of damage or shock to the solar cell panel 12 when the fastening member 30 is closely fitted into the solar cell panel 12. However, the embodiments of the invention are not limited thereto, and a position of the first fastening member 32 may be changed based on the shape of the frame 14.

In the present embodiment, the first fastening member 32, for example, may be a nut having screw threads 32a formed at the inner circumference thereof. More specifically, the first fastening member 32 may be a lock nut (or a anti-loose nut, a loosening-prevention nut) which is provided at the inner circumference thereof with the screw threads 32a and configured to resist loosening due to external shock.

In this instance, the first fastening member 32 in the form of a lock nut is integrally coupled to the parallel portion 142b by riveting. That is, the first fastening member 32 may be one body formed of a single material, rather than being formed by welding or bonding different members to each other.

Hereinafter, a method of integrally coupling the first fastening member 32 to the parallel portion 142b by riveting and a coupling configuration of the first fastening member 32 will be described in detail with reference to FIGS. 3A to 3C.

Figure 3A:
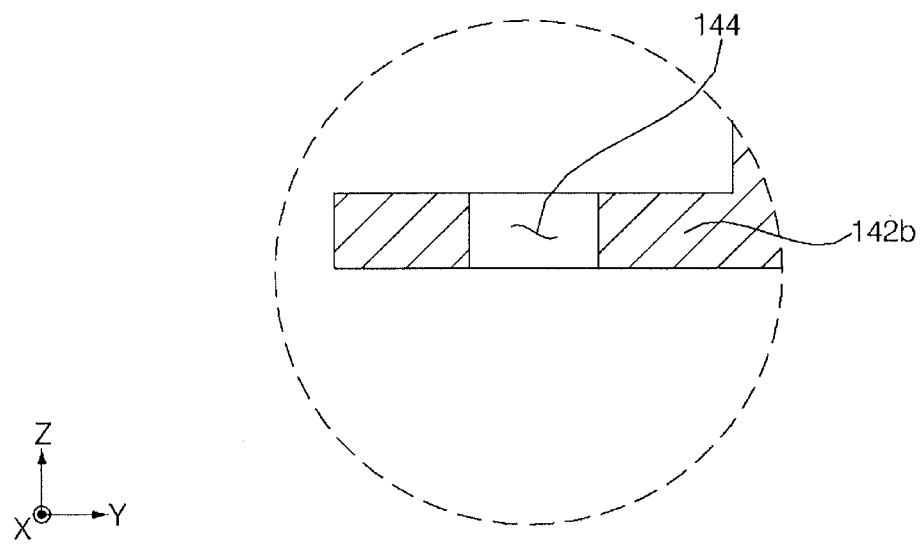
FIGS. 3A to 3C are partial sectional views showing a method of integrally coupling a first fastening member, by riveting, to a solar cell module in accordance with the embodiment of the invention.
Figure 3B:
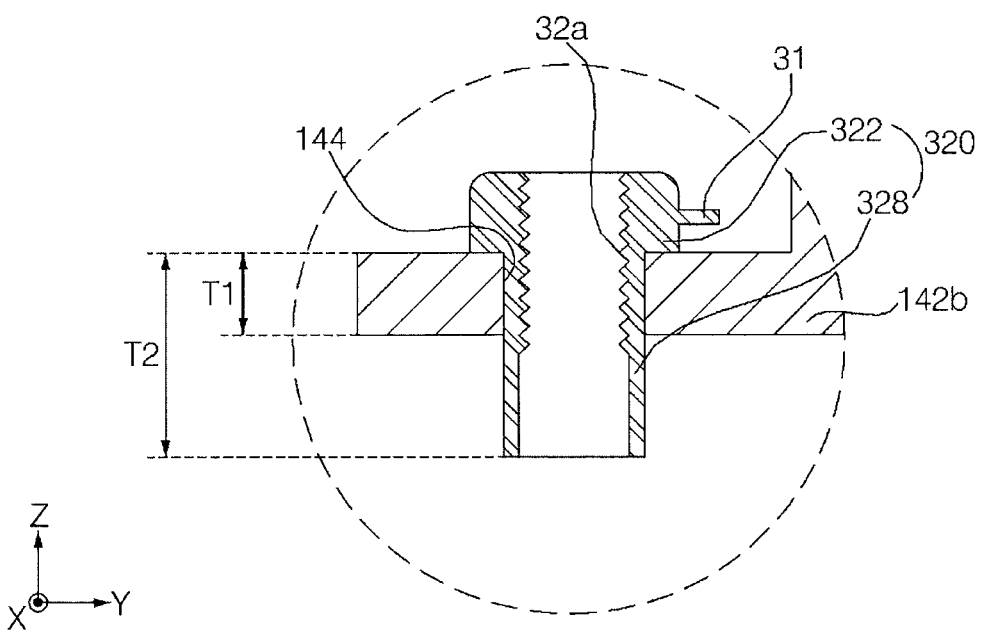
Figure 3C:
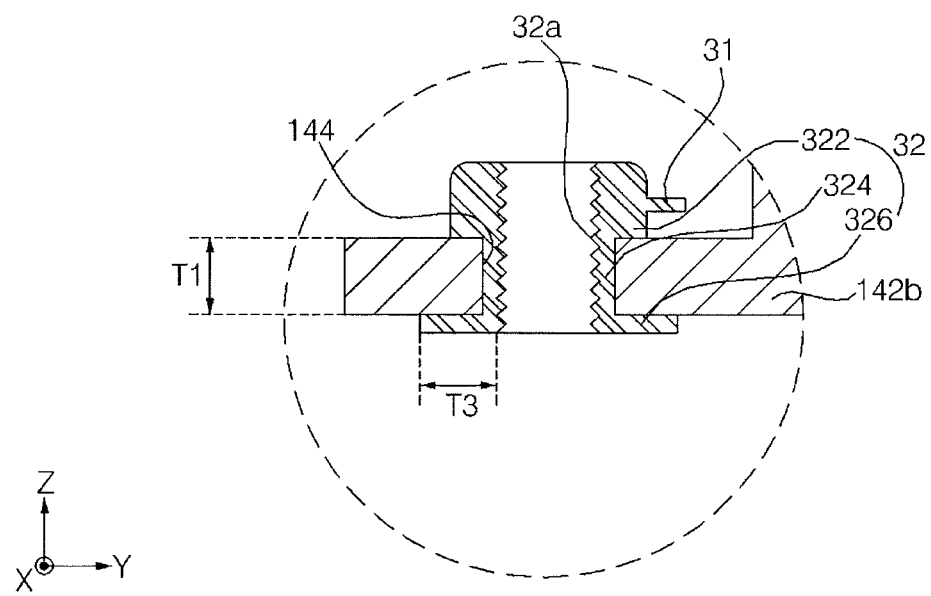

FIGS. 3A to 3C are partial sectional views showing a method of integrally coupling the first fastening member, by riveting, to the solar cell module in accordance with the embodiment of the invention.

First, as shown in FIG. 3A by example, the frame (designated by reference numeral 14 hereinafter as in FIG. 2), which includes the parallel portion 142b provided with the first fixing hole 144, is prepared. The first fixing hole 144 may be perforated via drilling (for example, drilling using a press) after formation of the frame 14, or may be perforated during formation of the frame 14.

Subsequently, as shown in FIG. 3B by example, a nut part 320 including a nut portion 322 and an extension 328 is prepared, and the extension 328 of the nut part 320 is positioned in the first fixing hole 144. The nut portion 322 has a greater area than that of the first fixing hole 144, and the extension 328 has an area approximately equal to or less than that of the first fixing hole 144. As such, the extension 328 may be easily inserted into the first fixing hole 144 and the nut portion 322 may ensure stable fixing of one end of the nut part 320.

The screw threads 32a are formed at the inner circumference of the nut portion 322 as well as the inner circumference of the extension 328. A length T2 of the extension 328 is greater than a thickness T1 of the parallel portion 142b, such that the extension 328 penetrates the parallel portion 142b to protrude outward.

Only a portion of the extension 328 located in the first fixing hole 144 may be provided with the screw threads 32a, and the remaining portion of the extension 328 protruding outward of the parallel portion 142b may be not provided with the screw threads 32a. This may ensure uniform distribution of pressure to be applied to a rivet portion (designated by reference numeral 326 of FIG. 3C) that will be described hereinafter, although the embodiments of the invention are not limited thereto. Alternatively, the screw threads 32a may be formed at the entire inner circumference of the extension 328, and various other modifications are also possible.

Subsequently, in a state in which the nut portion 322 comes into close contact with one side of the parallel portion 142b (i.e. the upper side of the drawing), pressure is applied to the extension (designated by reference numeral 328 hereinafter as in FIG. 3B) protruding outward from the other side of the parallel portion 142b (i.e. the lower side of the drawing). The pressure may be applied in various ways, and for example, may be applied using a press. As such, the outwardly protruding portion of the extension 328 is deformed to come into close contact with the other side of the parallel portion 142b, thereby forming the rivet portion 326.

In this way, the first fastening member 32 is comprised of the nut portion 322 located to come into close contact with one side of the frame 14 (more particularly, the parallel portion 142b), a connection portion 324 extending from the nut portion 322 and located in the first fixing hole 144, and the rivet portion 326 extending from the connection portion 324 and located to come into close contact with the other side of the frame 14 (more particularly, the parallel portion 142b). Thus, as the parallel portion 142b is located between the nut portion 322 and the rivet portion 326, the first fastening member 32 is integrally coupled to the frame 14 (more particularly, the parallel portion 142b) such that separation of the first fastening member 32 from the frame 14 is impossible or is avoided.

In this instance, a ratio of a length T3 of the rivet portion 326 to a length T1 of the parallel portion 142b may be within a range of 0.6 to 1.5. When the ratio (T3/T1) is less than 0.6, the length T3 of the rivet portion 326 is too short to stably fix the first fastening member 32 to the parallel portion 142b. When the ratio (T3/T1) exceeds 1.5, the length T3 of the rivet portion 326 is too long to form the rivet portion 326 in the above described manner, which may increase usage of materials, and consequently increase material costs. In further consideration of fixing stability and cost reduction of the first fastening member 32, the ratio (T3/T1) may be within a range of 0.8 to 1.2. However, these numerical values are not absolute, and the aforementioned ratio (T3/T1) may vary as needed.

As mentioned above, the first fastening member 32 of the present embodiment may be a lock nut. That is, the first fastening member 32 may be a nut having a locking function. There may be various kinds of lock nuts.

Examples of lock nuts may include a screw deformation type lock nut in which the screw threads 32a, which have previously been partially deformed, provides increased friction to prevent loosening when returning to their original shape as a screw is tightened, a double nut type lock nut in which the nut portion 322 consists of two portions, an aid insertion type lock nut in which an additional insert member provides increased friction to prevent loosening when being deformed, and a fixing type lock nut in which a split pin or the like is used to prevent rotation of a nut. These various types of lock nuts will be described below in detail with reference to FIGS. 4A to 4F. FIGS. 4A to 4F are views showing the nut portion and/or the connection portion of the first fastening member which may be applied to the solar cell module and the photovoltaic power generation system in accordance with the embodiment of the invention. In FIGS. 4A to 4F, for brevity, only the nut portion 322 is shown, or the nut portion 322 and the connection portion 324 are partially or wholly shown.

Figure 4A:
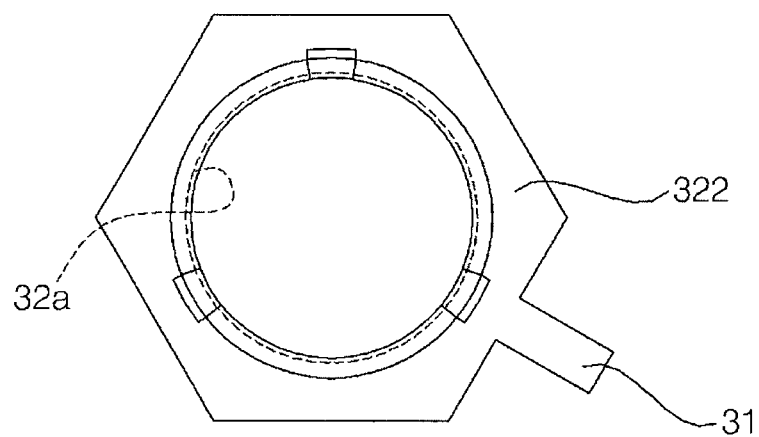
FIGS. 4A to 4F are views showing a nut portion and/or a connection portion of the first fastening member, which may be applied to the solar cell module and the photovoltaic power generation system in accordance with the embodiment of the invention.
Figure 4B:
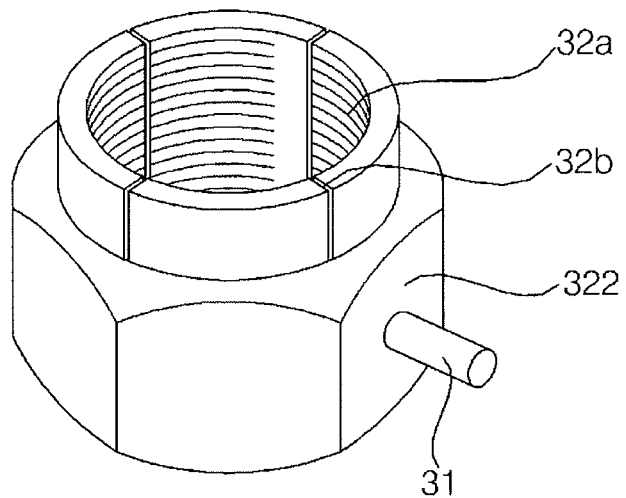
Figure 4C:
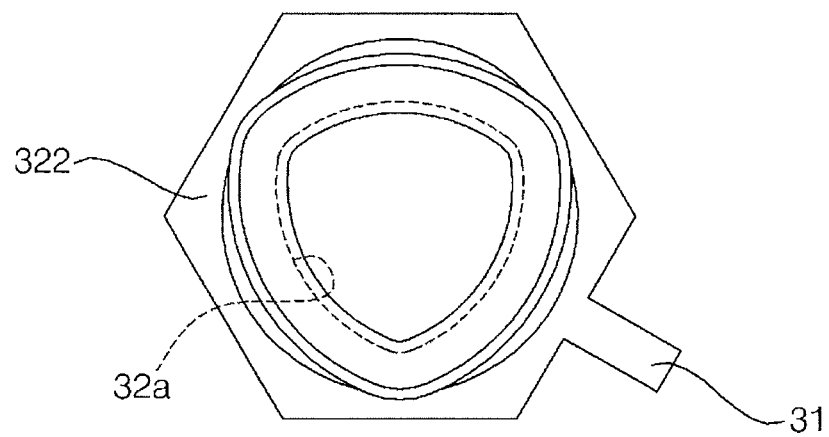

Referring to FIG. 4A, a few portions of the screw threads 32a, arranged at the same angular interval in a plane (for example, three portions of the screw threads 32a arranged at an interval of 120 degrees), may be locally deformed to prevent loosening. In another example, as shown in FIG. 4B by example, when narrow slits 32b may be vertically formed in the screw threads 32a and the nut portion 322 may be inwardly deformed to be tightened, the screw threads 32a may resist outward opening thereof to prevent loosening. In a further example, as shown in FIG. 4C by example, a few portions of the screw threads 32a arranged at the same angular interval (for example, three portions of the screw threads 32a arranged at an interval of 120 degrees) may be generally widely pushed to protrude outward from the remaining portion of the screw threads 32a to prevent loosening. In addition to the aforementioned screw deformation type lock nuts, of course, various other screw deformation type lock nuts may be applied to the embodiment of the invention.

Figure 4D:
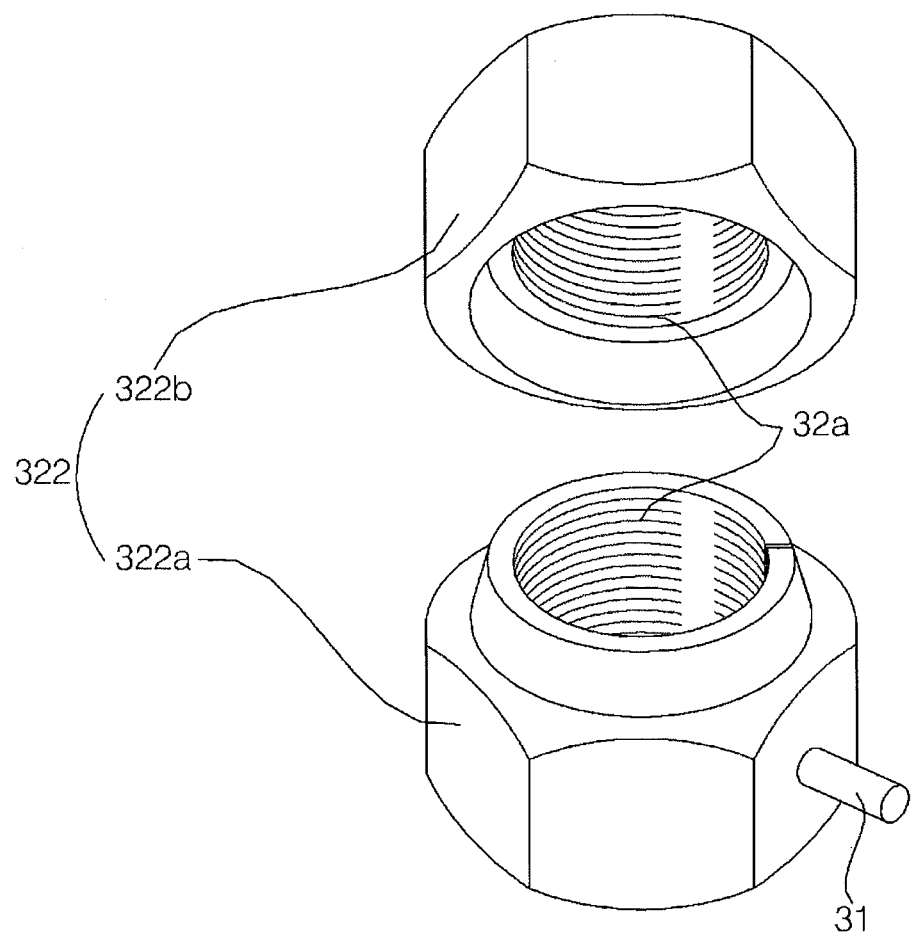

Alternatively, as shown in FIG. 4D by example, in the instance of a double nut type lock nut, a lower nut portion 322a, an upper contact surface of which is subjected to eccentric processing, may be coupled to an upper nut portion 322b subjected to center processing, to prevent loosening based on the principle of a wedge.

Figure 4E:
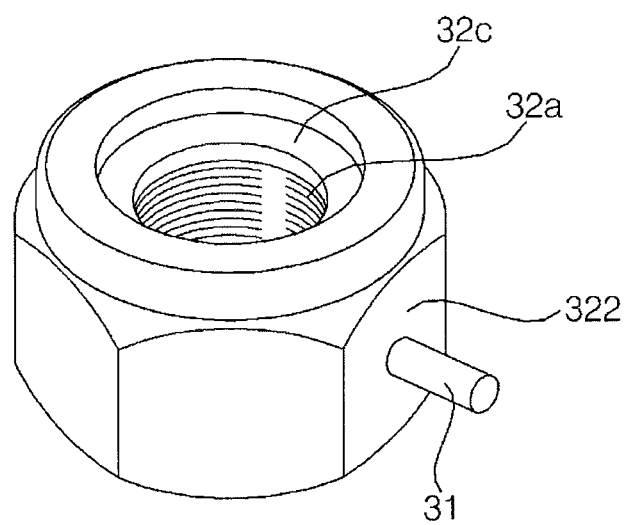
Figure 4F:
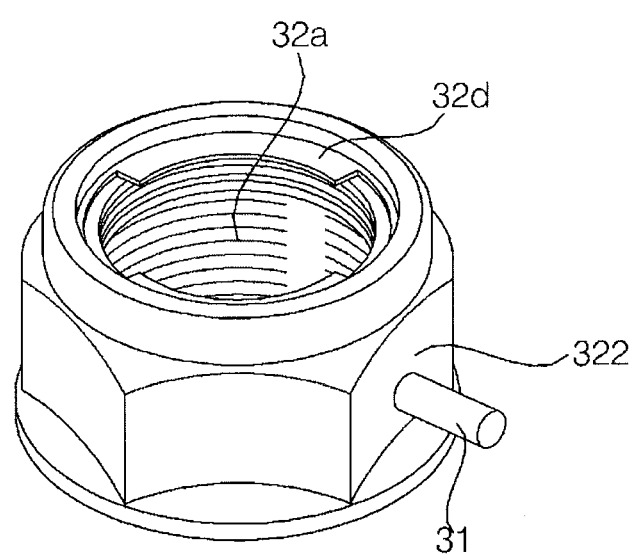

Alternatively, in the instance of an aid insertion type lock nut, as shown in FIG. 4E by example, a resin insert 32c may be inserted inside the screw threads 32a to prevent loosening. Alternatively, in the instance of a fixing type lock nut, as shown in FIG. 4F by example, a leaf spring 32d may be inserted inside the screw threads 32a to push the screw threads 32a of the nut portion 322 to prevent loosening.

Note that, in addition to the aforementioned lock nuts, various other types of lock nuts may be used as the first fastening member 32.

In addition, note that the aid insertion type lock nut needs an additional member, thus suffering from an increase in the number of elements and a complicated process. On the other hand, use of the screw deformation type lock nut or the double nut type lock nut as described above may reduce the number of elements, thus achieving cost reduction and preventing a complicated process. For this reason, in the present embodiment, a lock nut of a screw deformation type or double nut type may be used as the first fastening member 32 to ensure that the first fastening member 32 is capable of being loosened and tightened plural times (for example, five times or more).

In accordance with the present embodiment, at least one engagement member 31 is formed at a side surface of the nut portion 322. Here, the engagement member 31 refers to a portion that will be engaged with a portion of a first fastening tool (designated by reference numeral 220 hereinafter as in FIG. 5B) that used to grip the first fastening member 32 when the second fastening member 34 is loosened so as to be separated from the first fastening member 32. Through use of the first fastening tool, even though the first fastening member 32 is configured as a lock nut, the second fastening member 34 may be easily separated from the first fastening member 32 as needed. In addition, a general tool has difficulty in firmly gripping the first fastening member 32 of the present embodiment upon loosening of the second fastening member 34, which ensures that the first and second fastening members 32 and 34 cannot be usually separated from each other. This will be described below in more detail.

The engagement member 31 may take the form of a protrusion or a recess, for example. FIG. 2 and FIGS. 4A to 4F illustrate the engagement member 31 in the form of a single protrusion. When the engagement member 31 takes the form of a single protrusion, it is possible not only to provide the first fastening member 32 with a simplified configuration, but also to usually prevent loosening while allowing easy loosening as needed. However, the embodiments of the invention are not limited thereto, and the engagement member 31 may take the form of a recess, and a plurality of engagement members 31 may be provided. In addition, although the drawings illustrate the engagement member 31 in the form of a cylindrical column, the invention is not limited thereto. Thus, it will be appreciated that the engagement member 31 may have various other shapes, such as hexagonal, pyramidal, semispherical shapes, etc.

With regard to the above described engagement member 31, other details, such as the role, etc., will be described below in more detail with reference to FIGS. 5A and 5B.

Referring again to FIGS. 1 and 2, the support member 20 may be perforated with a second fixing hole 24 at a position corresponding to the first fixing hole 144. The second fixing hole 24 may be perforated before fastening of the second fastening member 34. Alternatively, the second fixing hole 24 may be perforated simultaneously with fastening of the second fastening member 34. In this instance, the second fixing hole 24 may be provided at the inner circumference thereof with screw threads corresponding to screw threads 34 of the second fastening member 34.

The second fastening member 34 is inserted through the first fixing hole 144 and the second fixing hole 24. In one example, the second fastening member 34 may be a bolt to be engaged with a nut. More specifically, the second fastening member 34 may have a head portion 342 having a greater area than that of the first and second fixing holes 144 and 24, and a bolt portion 344 provided with the screw threads 34a to be engaged with the screw threads 32a of the first fastening member 32. As the screw threads 34a of the second fastening member 34 having penetrated the support member 20 are engaged with the screw threads 32a of the first fastening member 32 located at the solar cell module 10, the solar cell module 10 and the support member 20 are fixed to each other.

In this instance, the fastening aid 36 may be interposed between the support member 20 and the head portion 342 to further enhance fastening strength. For example, various types or shapes of washers may be used as the fastening aid 36.

Figure 5A:
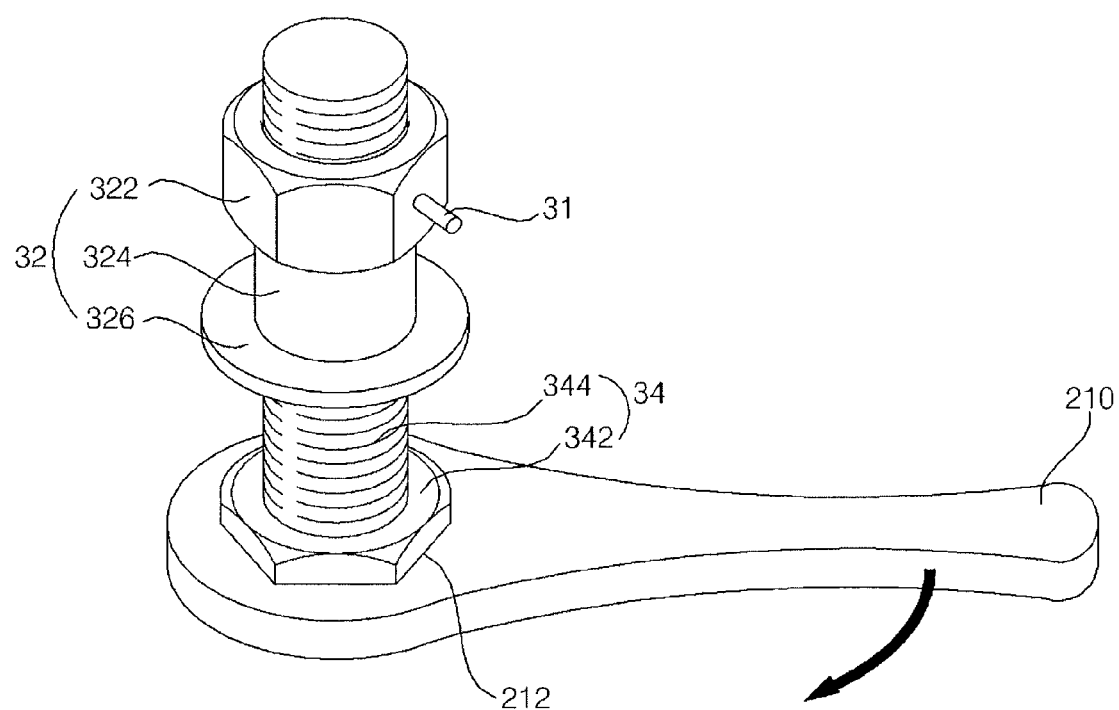
FIG. 5A is a perspective view schematically showing a process of fastening the first fastening member and a second fastening member to each other, which may be applied to the solar cell module and the photovoltaic power generation system in accordance with the embodiment of the invention.
Figure 5B:
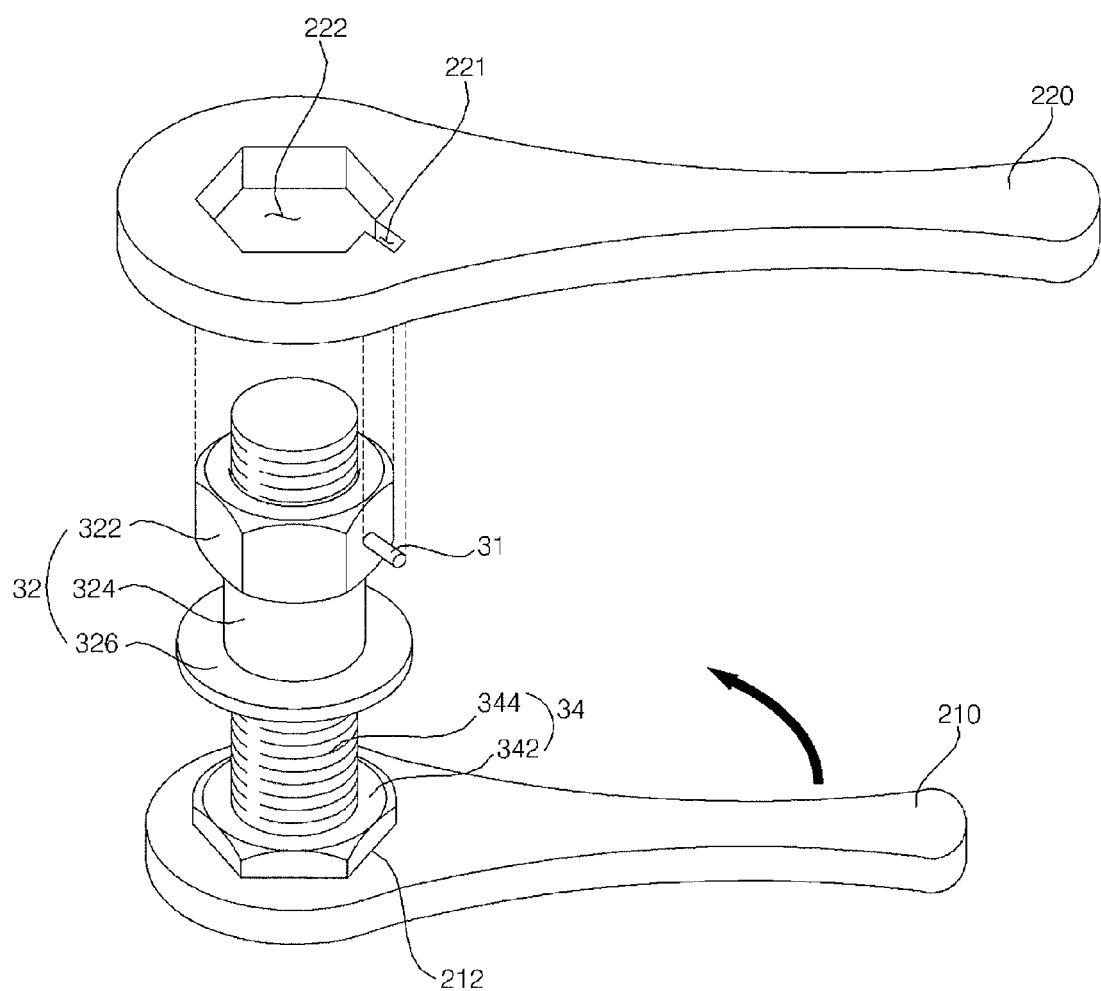
FIG. 5B is a perspective view schematically showing a process of separating the first fastening member and the second fastening member from each other, which may be applied to the solar cell module and the photovoltaic power generation system in accordance with the embodiment of the invention.

With reference to FIGS. 5A and 5B, fastening and separation of the first fastening member 32 and the second fastening member 34 in accordance with the embodiment of the invention will be described below in more detail. FIG. 5A is a perspective view schematically showing a process of fastening the first fastening member 32 and the second fastening member 34 to each other in accordance with the embodiment of the invention, and FIG. 5B is a perspective view schematically showing a process of separating the first fastening member 32 and the second fastening member 34 from each other in accordance with the embodiment of the invention. For clear explanation via simplified illustration, in FIGS. 5A and 5B, only the first fastening member 32 and the second fastening member 34 are shown, and illustration of other elements, such as the fastening aid 36, the solar cell panel 12, the frame 14, etc., is omitted.

As shown in FIG. 5A by example, when fastening the second fastening member 34 to the first fastening member 32 inserted in the first fixing hole (designated by reference numeral 144 hereinafter as in FIG. 1), a second fastening tool 210 is used to fasten the second fastening member 34. In the present embodiment, as a result of the first fastening member 32 being integrally coupled to the frame 14 (more particularly, the parallel portion 142b), the solar cell module 10 may be fixed to the support member 20 via a simplified process of putting the support member 20 on the solar cell module 10 and fastening the second fastening member 34 to the first fastening member 32.

In one example, the second fastening tool 210 may be any one of various tools, such as a spanner, a manual driver, an electric driver, etc. In this instance, since the first fastening member 32 has been previously inserted into the first fixing hole 144, the second fastening member 34 may be easily fastened to the first fastening member 32 as the second fastening tool 210 grips the second fastening member 34 and turns the second fastening member 34 in a screw tightening direction.

In this instance, owing to the fact that the first fastening member 32 is riveted so as not to be separated from the frame 14, further enhanced fixing stability may be accomplished via the simplified process. That is, enhanced fixing stability and reduced manufacturing costs may be accomplished as compared to the use of an adhesive, for example.

Moreover, owing to the fact that the first fastening member 32 is a lock nut, it is possible to prevent the second fastening member 34 from being separated from the first fastening member 32 even if external shock is applied to the solar cell module 10 or the photovoltaic power generation system 100. Accordingly, it is possible to prevent damage to the solar cell module 10 due to loosening of the fastening member 30 in an unwanted situation, and to prevent reduction in power generation quantity of the solar cell module 10 due to vibration caused when the fastening member 30 is loosened. Consequently, the first and second fastening members 32 and 34 may usually remain fastened to each other without a risk of unwanted separation, which may enhance operational stability and efficiency of the photovoltaic power generation system 100.

Meanwhile, when it is desired to shift an installation position of the photovoltaic power generation system 100, or to repair or exchange the solar cell module 10, it is necessary to separate the second fastening member 34 from the first fastening member 32. In this instance, as described above, since the lock nut used as the first fastening member 32 is capable of being loosened or tightened plural times, easy position shift of the photovoltaic power generation system 100 as well as easy repair or exchange of the solar cell module 10 are possible.

However, note that, when the first fastening member 32 has a locking function as described above, greater force may be required to separate the first fastening member 32 and the second fastening member 34 from each other as needed. Accordingly, upon separation of the first fastening member 32 and the second fastening member 34, as shown in FIG. 5B by example, in a state in which the first fastening tool 220 grips the first fastening member 32, the second fastening tool 210 may turn the second fastening member 34 to loosen the second fastening member 34.

In this instance, the first fastening tool 220 may be a spanner, for example. Here, the first fastening tool 220 may be a closed-mouth spanner having openings 221 and 222 formed in a grip region thereof for grip of the first fastening member 32. This kind of first fastening tool 220 may achieve maximum grip force for the first fastening member 32. However, the embodiments of the invention are not limited thereto, and various other tools, such as an open-mouth spanner, may be used as the first fastening tool 220.

The openings 221 and 222 of the first fastening tool 220 include a nut opening 222 corresponding to the nut portion 322 and an engagement opening 221 corresponding to the engagement member 31. The engagement member 31 of the first fastening member 32 will be located in the engagement opening 221 of the first fastening tool 220 and the nut portion 322 of the first fastening member 32 will be located in the nut opening 221 of the first fastening tool 220. Thus, when the first fastening tool 220 grips the first fastening member 32 in the above described arrangement, the engagement member 31 and the engagement opening 221 are engaged with each other, which may allow the first fastening tool 220 to strongly grip the first fastening member 32. Thereby, the second fastening member 34 may be easily loosened when the second fastening tool 210 turns the second fastening member 34 in the above described strongly fixed state of the first fastening member 32.

As described above, in the present embodiment, as a result of providing the first fastening member 32 with the engagement member 31, it is possible to apply strong grip force to the first fastening member 32, which may consequently allow the second fastening member 34 to be easily loosened from the first fastening member 32 in the form of a lock nut.

In addition, in the present embodiment, as a result of providing the first fastening member 32 with the engagement member 31 in the form of a protrusion, for example, a general spanner having only a nut opening cannot be used to grip the first fastening member 32. Thus, only a person who has the first fastening tool 220 having a shape corresponding to that of the first fastening member 32 provided with the engagement member 31 can separate the first fastening member 32 and the second fastening member 34 from each other. In other words, only a person who has the first fastening tool 220 having a specific shape of the engagement opening 221, such as, for example, a user, owner, or manager of the photovoltaic power generation system 100 can separate the first fastening member 32 and the second fastening member 34 from each other, and unauthorized persons cannot separate the first fastening member 32 and the second fastening member 34 from each other. That is, when using a general fastening tool not having a specific shape of the engagement opening 221, the engagement member 31 causes dispersion of force applied by the fastening tool and the fastening tool may partially fail to come into close contact with the nut portion 322, which makes it impossible or difficult for the fastening tool to apply strong grip force to the nut portion 322. Consequently, the general fastening tool cannot separate the second fastening member 34 from the first fastening member 32 in the form of a lock nut.

Accordingly, there is no risk of the solar cell module 10 being stolen through separation of the first fastening member 32 and the second fastening member 34. Conventionally, the photovoltaic power generation system 100, which is installed in an outdoor area, has a high risk of theft. On the other hand, in the present embodiment, provision of the engagement member 31 may considerably reduce a risk of theft.

In the above described embodiment, one support member 20 is located at the top of the solar cell module 10 and the other support member 20 is located at the bottom of the solar cell module 10 such that the two support members 20 correspond to the major face of each solar cell module 10. As such, two fastening members 30 are respectively located at one side and the other side of the top of the solar cell module 10 and two fastening members 30 are respectively located at one side and the other side of the bottom of the solar cell module 10. However, this arrangement of the fastening members 30 is suggested by way of one example, and the number and positions of the support members 20 corresponding to each solar cell module 10 and the number and positions of the fastening members 30 may be changed in various ways.

Hereinafter, fastening members for the photovoltaic power generation system in accordance with other embodiments of the invention will be described in detail with reference to FIGS. 6 to 8 and FIGS. 9A to 9C. In the following description, a detailed description of the same or similar parts to those of the above described embodiment will be omitted, and only different parts will be described in detail.

Figure 6:
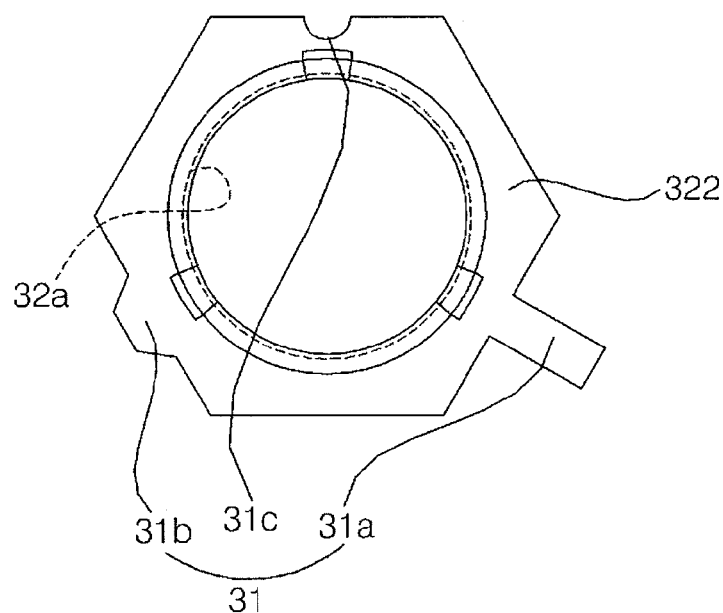
FIG. 6 is a plan view showing a first fastening member which may be applied to the photovoltaic power generation system in accordance with another embodiment of the invention.
Figure 7:
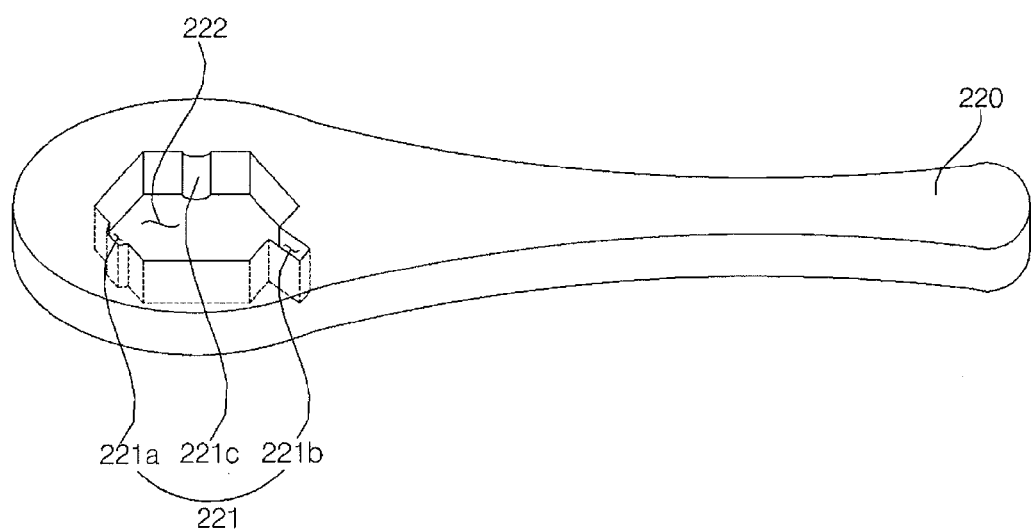
FIG. 7 is a plan view showing a first fastening tool for the first fastening member which may be applied to the photovoltaic power generation system in accordance with the other embodiment of the invention.

FIG. 6 is a plan view of a first fastening member, which may be applied to the photovoltaic power generation system, in accordance with another embodiment of the invention, and FIG. 7 is a perspective view of a first fastening tool for the first fastening member which may be applied to the photovoltaic power generation system in accordance with the other embodiment of the invention.

Referring to FIG. 6, in the present embodiment, a plurality of engagement members 31 having different shapes may be provided. In one example, a first engagement member 31a may take the form of a relatively long protrusion, a second engagement member 31b may take the form of a relatively short protrusion, and a third engagement member 31c may take the form of a recess. Then, referring to FIG. 7, the first fastening tool 220, used to grip the first fastening member 32, may have the nut opening 212 corresponding to the nut portion 322, a first engagement opening 221a corresponding to the first engagement member 31a, a second engagement opening 221b corresponding to the second engagement member 31b, and a third engagement bump 221c corresponding to the third engagement member 31c.

Through provision of the plural engagement members 31 as described above, the first fastening member 32 and the first fastening tool 220 may achieve stronger engagement therebetween, which ensures easier loosening of the second fastening member 34. In addition, through provision of the plural engagement members 31 having different shapes, it is possible to prevent attempts to fasten the first fastening member 32 using general tools (for example, an open-mouth spanner). This may ensure more effective theft prevention. In particular, when the engagement members 31 take the form of protrusions having different shapes, more enhanced theft prevention may be accomplished.

Figure 8:
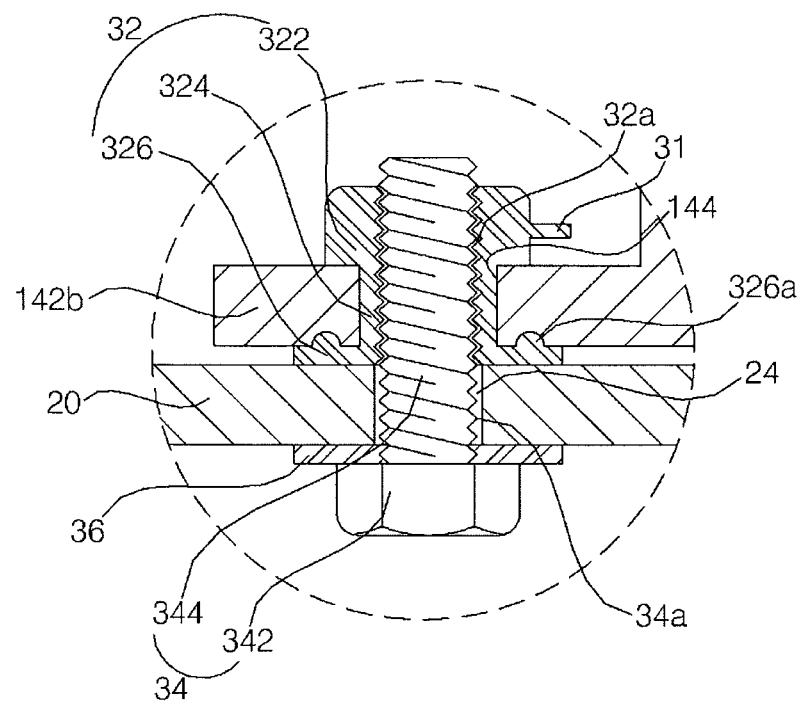
FIG. 8 is an enlarged view showing a fastening member which may be applied to the photovoltaic power generation system in accordance with a further embodiment of the invention.
Figure 9A:
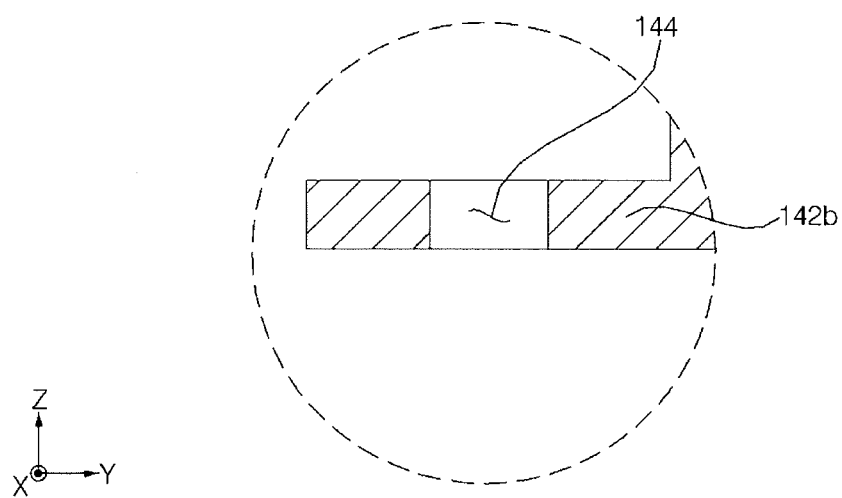
FIGS. 9A to 9C are partial sectional views showing a method of integrally coupling a first fastening member, by riveting, to the solar cell module in accordance with the further embodiment of the invention.
Figure 9B:
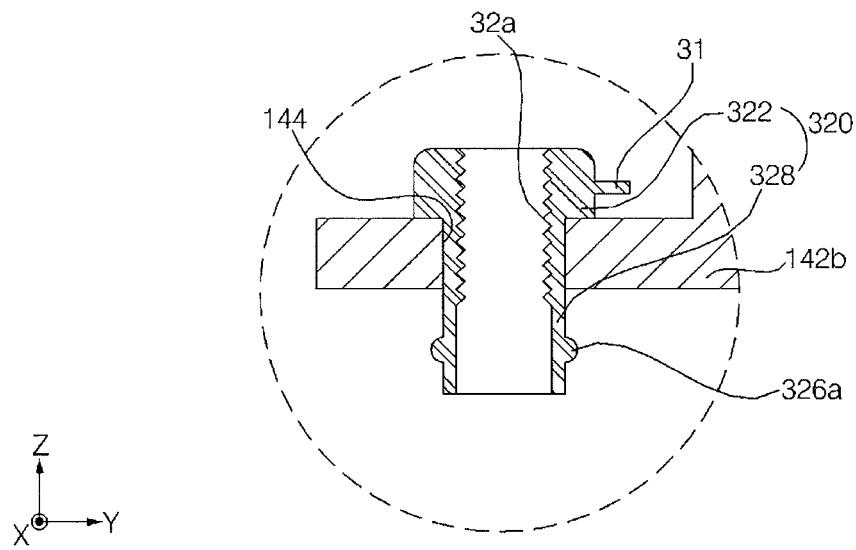
Figure 9C:
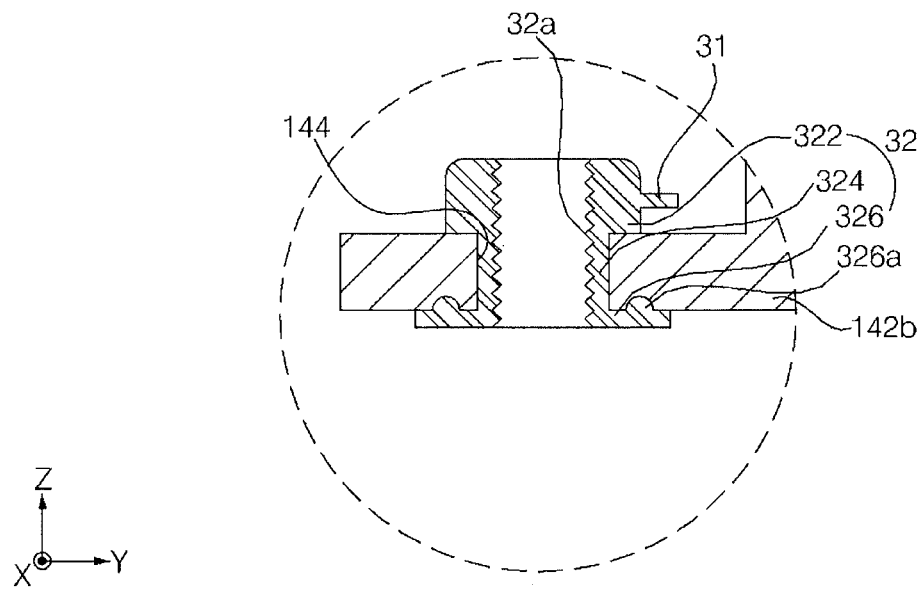

FIG. 8 is an enlarged view of a fastening member which may be applied to the photovoltaic power generation system in accordance with a further embodiment of the invention, and FIGS. 9A to 9C are partial sectional views showing a method of integrally coupling a first fastening member, by riveting, to the solar cell module in accordance with the embodiment of the invention.

Referring to FIG. 8, the rivet portion 326 of the first fastening member 32 in accordance with the present embodiment is provided with a projected portion 326a protruding toward the parallel portion 142b of the frame 14. As such, the projected portion 326a may be embedded into the parallel portion 142b when a press applies pressure to form the rivet portion 326. Thereby, fixing stability of the first fastening member 32 and the frame 14 may be further enhanced. A plurality of projected portions 326a may be formed on the rivet portion 326, and may be arranged in a symmetrical pattern.

The first fastening member 32 in accordance with the present embodiment may be integrally fixed to the frame in a method similar to the above description with reference to FIGS. 3A to 3C.

More specifically, as shown in FIG. 9A by example, the frame 14 including the parallel portion 142a is prepared.

Subsequently, as shown in FIG. 9B by example, the extension 328 of the first fastening member 32 is located in the first fixing hole 144. In this instance, the projected portion 326b is located at an outer surface of a portion of the extension 328 protruding outward of the parallel portion 142a. A width of the portion of the extension 328 where the projected portion 326a is formed may be approximately equal to or less than a diameter of the first fixing hole 144. Alternatively, a width of the remaining portion of the extension 328 where the projected portion 326a is not formed may be approximately equal to a diameter of the first fixing hole 144. In this instance, when force is applied to the first fastening member 32 to push the extension 328 into the first fixing hole 144, the extension 328 may be slightly deformed inward to thereby pass through the first fixing hole 144.

Subsequently, as shown in FIG. 9C by example, in a state in which the nut portion 322 comes into close contact with one side of the parallel portion 142b (i.e. the upper side of the drawing), pressure is applied to the extension (designated by reference number 328 hereinafter as in FIG. 9B) from the other side of the parallel portion 142b (i.e. the lower side of the drawing). Thereby, as an outwardly protruding portion of the extension 328 is deformed to come into close contact with the other side of the parallel portion 142b, the rivet portion 326 is formed. In this instance, the projected portion 326a formed at the rivet portion 326 is press fitted into the other side of the parallel portion 142b, which may further enhance fixing stability of the first fastening member 32 and the frame 14.

As is apparent from the above description, in accordance with the embodiments, as a result of coupling (more particularly, integrally coupling) a first fastening member to a frame of a solar cell module, the solar cell module may be fixed to a support member via a simplified process of putting the support member on the solar cell module and fastening a second fastening member to the first fastening member. In this instance, since the first fastening member is riveted so as not to be separated from the frame, further enhanced fixing stability may be accomplished via the simplified process. That is, enhanced fixing stability and reduced manufacturing costs may be accomplished as compared to the use of an adhesive, for example.

Moreover, as a result of using the first fastening member in the form of a lock nut to resist loosening, it is possible to prevent damage to the solar cell module and reduction of power generation quantity. This may result in enhanced operational stability and efficiency of a photovoltaic power generation system. The lock nut, used as the first fastening member, is capable of being loosened and tightened plural times, thus allowing the solar cell module to be disassembled from the support member and thereafter reassembled thereto. In the embodiments, moreover, the first fastening member is provided with an engagement member to achieve easy separation of the first and second fastening members as needed as well as theft prevention.

The above described features, configurations, effects, and the like are included in at least one of the embodiments of the invention, and should not be limited to only one embodiment. In addition, the features, configurations, effects, and the like as illustrated in each embodiment may be implemented with regard to other embodiments as they are combined with one another or modified by those skilled in the art. Thus, content related to these combinations and modifications should be construed as including in the scope and spirit of the invention as disclosed in the accompanying claims.

What is claimed is:

1. A solar cell module comprising:
a solar cell panel;
a frame located at a peripheral portion of the solar cell panel, the frame having a fixing hole; and
a first fastening member inserted into the fixing hole and fixed to the fixing hole, the first fastening member including an engagement member comprising a first protrusion and a second protrusion having different shapes or different protruding lengths being provided at a side surface of the first fastening member to be engaged with a fastening tool,
wherein the first fastening member includes a first fastening portion to be engaged with a second fastening portion of a second fastening member,
wherein the first fastening member includes a nut portion directly coupled and fixed to the fixing hole and the frame,
wherein the first fastening member includes the nut portion disposed on one face of the frame, the nut portion having a greater area than a planar area of the fixing hole, a connection portion extending from the nut portion and located in the fixing hole, and a rivet portion extending from the connection portion and disposed on an opposite face of the frame, the rivet portion having a greater area than the planar area of the fixing hole,
wherein screw threads are formed at inner surfaces of the nut portion and the connection portion,
wherein the nut portion, the connection portion, the rivet portion, and the engagement member constitute a single body,
wherein the frame includes a first part into which at least a portion of the solar cell panel is inserted, and a second part extending from the first part and apart from the solar cell panel,
wherein the fixing hole and the first fastening member are located at the second part of the frame,
wherein the nut portion is positioned at the one face of the frame adjacent to the solar cell panel,
wherein the rivet portion is positioned at the opposite face of the frame adjacent to a support member, and
wherein the engagement member is positioned at an outer surface of the nut portion included in the first fastening member.

2. The module according to claim 1, wherein the engagement member is positioned external to the frame and is separated from the frame.

3. The module according to claim 1, wherein the engagement member further comprises a recess.

4. The module according to claim 1, wherein the nut portion and the rivet portion are perpendicular to the connection portion.

5. The module according to claim 1, wherein the rivet portion is provided with a projected portion protruding towards the opposite face of the frame.

6. The module according to claim 1, wherein the nut portion, the connection portion, and the rivet portion of the first fastening member are integral with each other to form one body.

7. The module according to claim 1, wherein the first fastening member includes a lock nut to resist loosening.

8. The module according to claim 1, wherein the first fastening member includes a nut integrally fixed to the frame so as not to be separated from the frame.

9. The module according to claim 1, wherein the first fastening member is coupled to the frame by riveting.

10. The module according to claim 1, wherein the second part including an orthogonal portion extending perpendicular to the solar cell panel and a parallel portion extending parallel to the solar cell panel, and
wherein the fixing hole and the first fastening member are located at the parallel portion.

11. The module according to claim 1, wherein the second part of the frame is bent away from the first part of the frame, is parallel to the solar cell panel, and overlaps with the peripheral portion of the solar cell panel.

12. A photovoltaic power generation system comprising:
a solar cell module including a solar cell panel and a frame located at a peripheral portion of the solar cell panel, the frame having a first fixing hole and fixed to the first fixing hole;
a support member to support the solar cell module; and
a fastening member to fix the solar cell module and the support member to each other,
wherein the fastening member includes:
a first fastening member inserted into the first fixing hole to be fixed to the fixing hole, the first fastening member including an engagement member comprising a first protrusion and a second protrusion having different shapes or different protruding lengths being provided at a side surface of the first fastening member to be engaged with a fastening tool; and
a second fastening member connected to the support member and fastened to the first fastening member,
wherein the first fastening member includes a first fastening portion and the second fastening member includes a second fastening portion to be engaged with the first fastening portion,
wherein the first fastening member includes a nut portion directly coupled and fixed to the first fixing hole and the frame,
wherein the first fastening member includes the nut portion disposed on one face of the frame, the nut portion having a greater area than a planar area of the first fixing hole, a connection portion extending from the nut portion and located in the first fixing hole, and a rivet portion extending from the connection portion and disposed on an opposite face of the frame, the rivet portion having a greater area than the planar area of the first fixing hole,
wherein screw threads are formed at inner surfaces of the nut portion and the connection portion,
wherein the nut portion, the connection portion, the rivet portion, and the engagement member constitute a single body, wherein the frame includes a first part into which at least a portion of the solar cell panel is inserted, and a second part extending from the first part and apart from the solar cell panel, wherein the first fixing hole and the first fastening member are located at the second part, wherein the support member is positioned on the second part of the frame and the rivet portion of the first fastening member, wherein the second fastening member comprises a bolt penetrating the support member, reaching the first fastening portion of the first fastening member, and being fastened to the first fastening portion of the first fastening member at the connection portion inside the first fixing hole for fixing the frame to the support member, and wherein the engagement member is positioned external to the frame and is separated from the frame.

13. The photovoltaic power generation system according to claim 12, wherein the engagement member further comprises a recess.

14. The photovoltaic power generation system according to claim 12, wherein the support member has a second fixing hole corresponding to the first fixing hole, and wherein the second fastening member includes the bolt passing through the second fixing hole and be fastened to the first fastening member.

15. The photovoltaic power generation system according to claim 12, further comprising a fastening aid located between the second fastening member and the support member, wherein the fastening aid includes a washer.

16. The photovoltaic power generation system according to claim 12, wherein the engagement member is formed at the nut portion.

17. The photovoltaic power generation system according to claim 12, wherein the first fastening member includes a lock nut to resist loosening.

18. The photovoltaic power generation system according to claim 12, wherein the second part of the frame is bent away from the first part of the frame, is parallel to the solar cell panel, and overlaps with the peripheral portion of the solar cell panel.

* * * * *